United States Patent
Hendryx

(10) Patent No.: US 8,060,284 B2
(45) Date of Patent: Nov. 15, 2011

(54) WORK MACHINE WITH TORQUE LIMITING CONTROL FOR AN INFINITELY VARIABLE TRANSMISSION

(75) Inventor: Alec Benjamin Hendryx, Coffeyville, KS (US)

(73) Assignee: Deere & Company, Moline, IL (US)

( * ) Notice: Subject to any disclaimer, the term of this patent is extended or adjusted under 35 U.S.C. 154(b) by 1019 days.

(21) Appl. No.: 11/931,396

(22) Filed: Oct. 31, 2007

(65) Prior Publication Data

US 2009/0112415 A1    Apr. 30, 2009

(51) Int. Cl.
    *G05D 3/00* (2006.01)
(52) U.S. Cl. ............ 701/54; 701/22; 701/50; 701/51; 475/5; 475/41; 475/43; 475/46; 475/48; 475/107; 475/169; 475/170; 475/207; 475/216; 180/65.7; 180/65.25; 180/65.235; 180/65.265; 180/65.275; 903/910; 903/918; 903/946; 903/951; 477/117; 477/115
(58) Field of Classification Search .............. 701/22, 701/50, 51, 54; 475/5, 41, 46, 43, 48, 107; 475/169, 170, 207, 216; 180/65.7, 65.25, 180/65.235, 65.265, 65.275; 903/910, 918, 903/946, 951; 477/37, 115; 74/117, 125.5; 56/10.7
See application file for complete search history.

(56) References Cited

U.S. PATENT DOCUMENTS

| | | | |
|---|---|---|---|
| 3,258,286 A * | 6/1966 | Coward ............... 294/19.2 |
| 5,791,887 A * | 8/1998 | Williams et al. .......... 418/55.2 |
| 5,961,418 A * | 10/1999 | Taniguchi et al. ............ 477/47 |
| 5,967,756 A | 10/1999 | Devier et al. |
| 6,405,844 B1 | 6/2002 | Takamatsu |
| 6,565,481 B2 | 5/2003 | Toukura et al. |
| 6,666,793 B2 | 12/2003 | Narita et al. |
| 7,530,649 B2 * | 5/2009 | Kusano ............... 303/151 |
| 7,819,212 B2 * | 10/2010 | Kawasaki ............... 180/65.265 |
| 7,841,432 B2 * | 11/2010 | Lynn et al. ............... 180/65.21 |
| 2002/0004438 A1 | 1/2002 | Toukura et al. |
| 2002/0115529 A1 | 8/2002 | Narita et al. |
| 2004/0211614 A1 | 10/2004 | Matsuyama |
| 2007/0215248 A1 * | 9/2007 | Carpentier et al. .......... 144/382 |
| 2007/0281826 A1 | 12/2007 | Hindman et al. |
| 2008/0166212 A1 * | 7/2008 | Hested et al. ............... 414/618 |
| 2008/0251302 A1 * | 10/2008 | Lynn et al. ............... 180/65.2 |
| 2009/0112413 A1 * | 4/2009 | Eastman et al. ............... 701/54 |
| 2009/0112414 A1 * | 4/2009 | Eastman et al. ............... 701/54 |
| 2009/0163319 A1 * | 6/2009 | Janasek ............... 477/78 |
| 2010/0299048 A1 * | 11/2010 | Schindler et al. ............ 701/103 |

FOREIGN PATENT DOCUMENTS

EP    1172249 A2    1/2002
WO    2007074608    7/2007

OTHER PUBLICATIONS

European Search Report, 6 Pages, Aug. 9, 2010.

* cited by examiner

*Primary Examiner* — James Trammell
*Assistant Examiner* — McDieunel Marc

(57) ABSTRACT

A work machine includes an internal combustion (IC) engine having an output, and an infinitely variable transmission (IVT) coupled with the IC engine output. The IVT includes a hydraulic module and a mechanical drivetrain module. A pressure transducer is associated with and provides an output signal representing a hydraulic pressure within the hydraulic module. At least one electrical processing circuit is configured for controlling the IC engine output, dependent upon the output signal from the pressure transducer.

15 Claims, 2 Drawing Sheets

WORK MACHINE WITH TORQUE LIMITING CONTROL FOR AN INFINITELY VARIABLE TRANSMISSION

FIELD OF THE INVENTION

The present invention relates to work machines, and, more particularly, to work machines including an internal combustion engine coupled with an infinitely variable transmission (IVT).

BACKGROUND OF THE INVENTION

A work machine, such as a construction work machine, an agricultural work machine or a forestry work machine, typically includes a prime mover in the form of an internal combustion (IC) engine. The IC engine may either be in the form of a compression ignition engine (i.e., diesel engine) or a spark ignition engine (i.e., gasoline engine). For most heavy work machines, the prime mover is in the form of a diesel engine having better lugging, pull-down and torque characteristics for associated work operations.

The step load response of an IC engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, nitrous oxides (NOx), etc.), noise or vibrations. The load impact may be the result of a drivetrain load (e.g., an implement towed behind the work machine) or an external load (e.g., an auxiliary hydraulic load such as a front end loader, backhoe attachment, etc.)

Engine systems as a whole react in a linear manner during the application of a transient load. Initially, the load is applied to the drive shaft of the IC engine. The IC engine speed decreases when the load increases. The engine speed drop is influenced by whether the governor is isochronous or has a speed droop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an IVT which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

One example of an IVT for use in a work machine is a hydromechanical transmission which includes a hydraulic module coupled with a planetary gear set. Another example of an IVT for a work machine is a hydrostatic transmission which includes a hydraulic module coupled with a gear set.

A work machine including an IVT may be prone to loss of traction control and wheel slip when the IVT ratio changes to match load conditions. The IVT controller senses engine speed and deepens the IVT ratio as engine speed decreases under load. When at low ground speeds, the amount of power required for the work machine is a low percentage of what the engine can generate, so the engine may not lug down when the output torque from the engine increases. The operator will then not be aware that the torque at the wheels is increasing. In this case, the drive wheels can lose traction and spin out without notice. This is undesirable for certain operations.

What is needed in the art is a work machine configured with an IVT which is not prone to losing traction in low ground speed conditions.

SUMMARY OF THE INVENTION

The invention in one form is directed to a work machine including an IC engine having an output, and an IVT coupled with the IC engine output. The IVT includes a hydraulic module and a mechanical drivetrain module. A pressure transducer is associated with and provides an output signal representing a hydraulic pressure within the hydraulic module. At least one electrical processing circuit is configured for controlling the IC engine output, dependent upon the output signal from the pressure transducer.

The invention in another form is directed to a method of operating a work machine including an IC engine having an output, and an IVT coupled with the IC engine output. The IVT includes a hydraulic module and a mechanical drivetrain module. The method includes the steps of: setting a torque limit associated with the IVT; sensing a hydraulic pressure within the hydraulic module; and controlling an output of the IC engine, dependent upon the sensed hydraulic pressure and the torque limit.

DETAILED DESCRIPTION OF THE INVENTION

Figure 1:
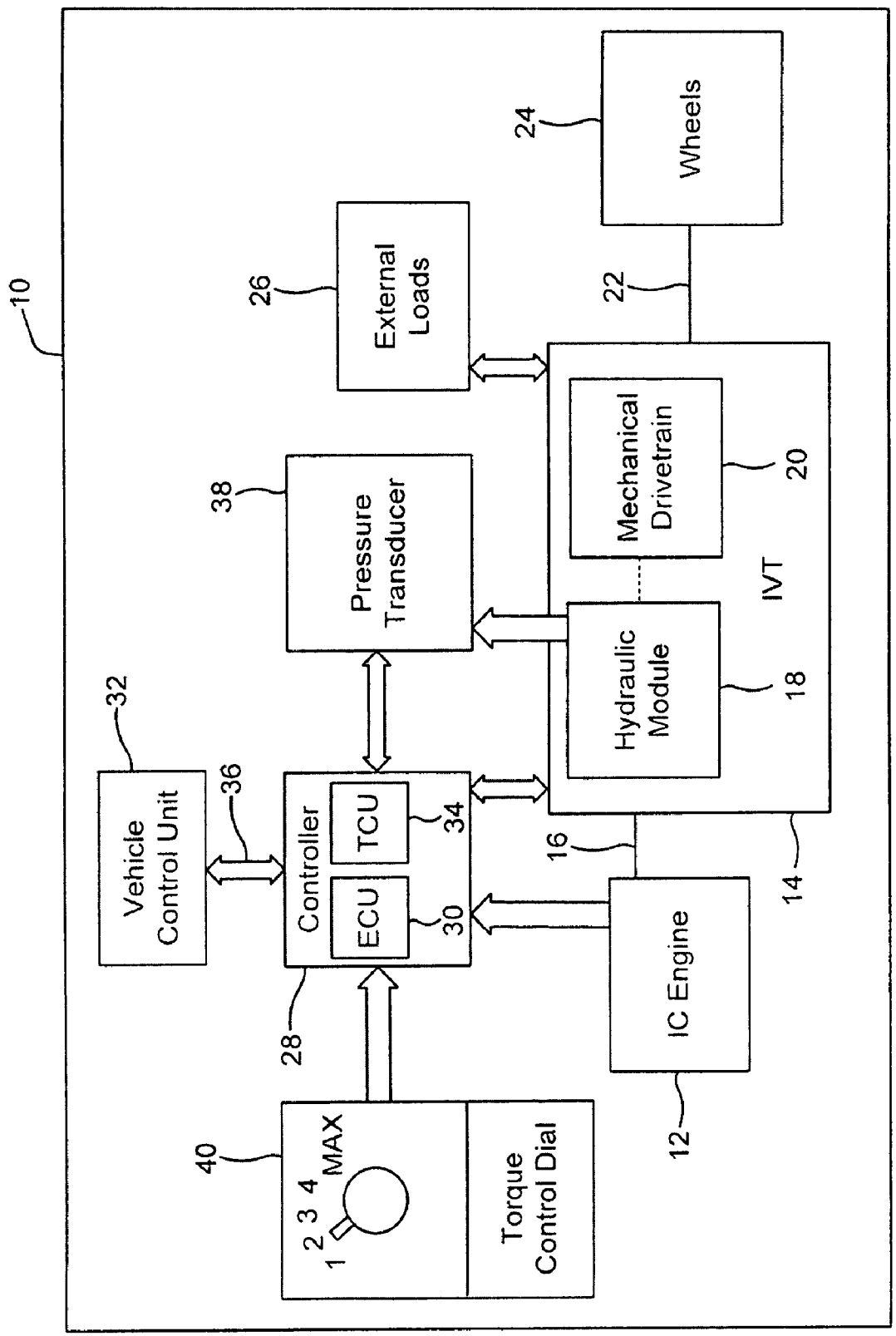
FIG. 1 is a schematic illustration of an embodiment of a work machine of the present invention.

Referring now to FIG. 1, there is shown a schematic illustration of an embodiment of a work machine 10 of the present invention. Work machine 10 could be a road grader, or a construction work machine such as a John Deere 644J front end loader, or a different type of work machine such as an agricultural, forestry or mining work machine.

Work machine 10 includes an IC engine 12 which is coupled with an IVT 14, typically through an output crankshaft 16 from IC engine 12. IC engine 12 is assumed to be a diesel engine in the illustrated embodiment, but could also be a gasoline engine, propane engine, etc. IC engine 12 is sized and configured according to the application.

IVT 14 generally includes a hydraulic module 18 and a mechanical drive train module 20. IVT 14 is assumed to be a hydromechanical transmission in the embodiment shown, but could also be a hydrostatic transmission, or other type of IVT. IVT 14 may be of conventional design, and thus is not described in great detail herein. IVT 14 has an output which is coupled with at least one other downstream drive train component 22, which in turn is coupled with a plurality of drive wheels 24, one of which is shown in FIG. 1. Of course, it will be appreciated that in the case of a track-type work vehicle, drive train component 22 may be coupled with a ground engaging track.

IVT 14 also provides output power to one or more external loads 26, which in turn thus provide an additional load on IC engine 12. External loads 26 typically are in the form of hydraulic loads, such as a front end loader, back hoe boom, grain unloading auger, tree felling saw motor, etc. The total load placed upon IC engine 12 thus is a function of both tractive loads and external hydraulic loads.

An electrical processing circuit 28 is configured as one or more controllers. In the embodiment shown, controller 28 includes an engine control unit (ECU) 30 which electronically controls operation of IC engine 12, and is coupled with a plurality of sensors (not specifically shown) associated with operation of IC engine 12. For example, ECU 30 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 30 may receive output signals from vehicle control unit (VCU) 32 representing vehicle control parameters input by an operator, such as a commanded ground speed (indicated by a position of the throttle and/or hydrostat lever) or a commanded direction of work machine 10 (indicated by an angular orientation of the steering wheel).

Similarly, transmission control unit (TCU) 34 electronically controls operation of IVT 14, and is coupled with a plurality of sensors associated with operation of IVT 14. ECU 30 and TCU 34 are coupled together via a bus structure providing two-way data flow, such as controller area network (CAN) bus 36.

Pressure transducer 38 is placed in communication with hydraulic module 18, preferably in communication with the pressure loop near the fixed hydrostatic unit. Pressure transducer 38 provides an output signal to TCU 34 representing the hydraulic pressure within hydraulic module 18. Pressure transducer 38 may be of conventional design, and is selected for the particular application.

A torque control input device 40 allows an operator to adjust the torque from IVT 14, which is controlled at least in part through controlling the output torque from IC engine 12. In the embodiment shown, torque control input device 40 is configured as a rotatable torque control dial which is positioned within an operator's station. Torque control dial 40 may have visible lines, numbers, serrations, etc. ranging between a minimum torque control setting and a maximum torque control setting. Alternatively, torque control input device 40 could be configured as an electronic touch screen, or any number of other configurations.

Although the various electronic components such as ECU 30, VCU 32 and TCU 34 are shown coupled together using wired connections, it should also be understood that wireless connections may be used for certain applications. Further, some of the internal electronic and fluid connections within the components of FIG. 1 are not shown for simplicity sake.

Figure 2:
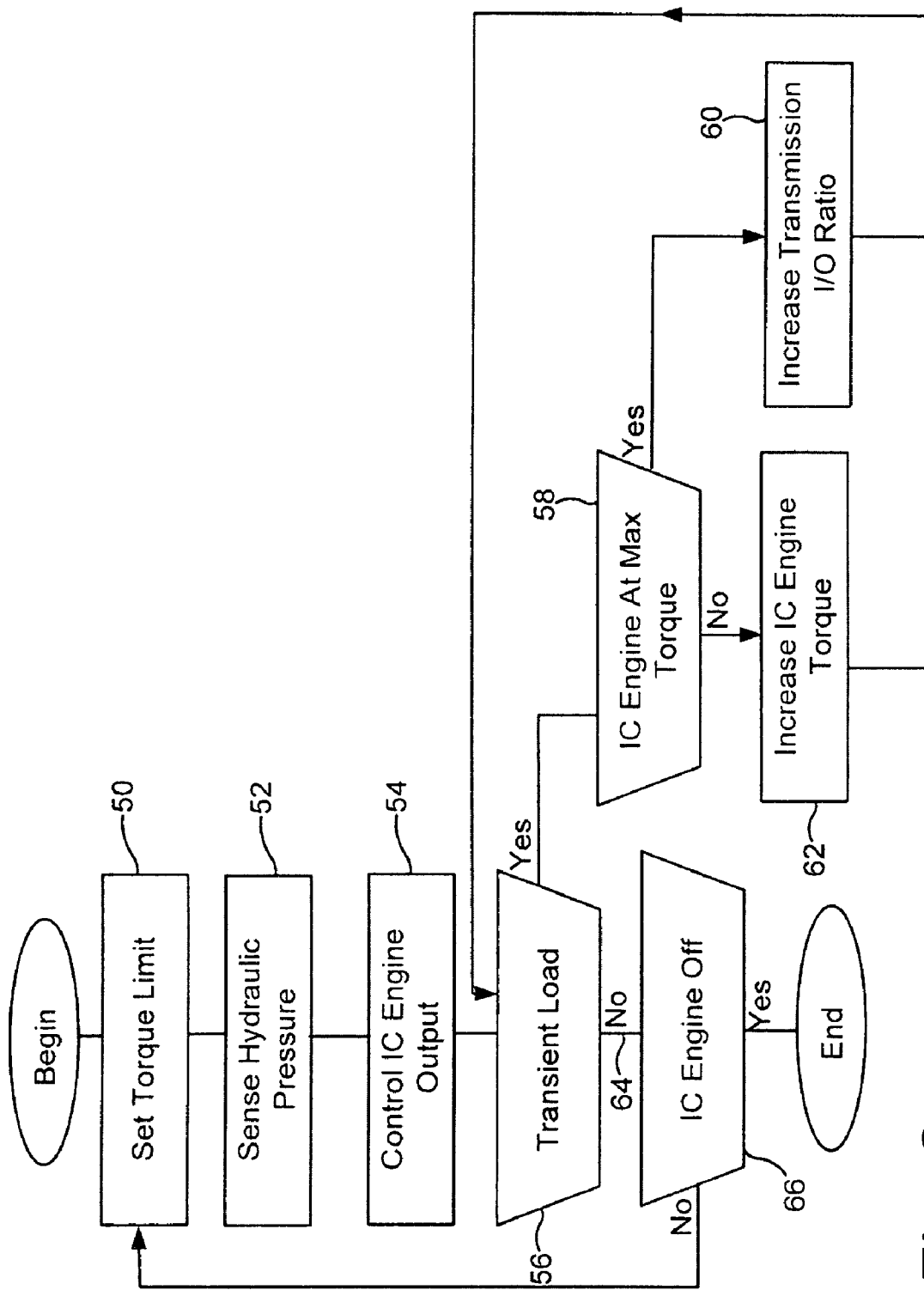
FIG. 2 illustrates a flowchart of an embodiment of the method of operation of a work machine of the present invention.

Referring now to FIG. 2, an embodiment of the method of the present invention for operation of work machine 10 will be described in greater detail. The flowchart shown in FIG. 2 accommodates most operating conditions, except where IC engine 12 is operating at or near idle conditions, in which case the output from IC engine 12 is not limited.

The torque limit from the output of IVT 14 is initially set using torque control dial 40 (block 50). The control knob setting corresponds to a desired output torque from IVT 14. Less aggressive settings prevent wheel slip in certain ground conditions, and more aggressive settings increase the maximum desired torque. Turning the knob to the less aggressive setting actually limits the pressure that is in the fixed hydrostatic unit that is directly connected to the planetary sun gear.

During operation, the hydraulic pressure within hydraulic module 18 is sensed using pressure transducer 38 (block 52). An output signal from pressure transducer 38 is outputted to TCU 34, which in turn outputs a signal to ECU 30. ECU 30 controls the output from IC engine 12, dependent upon both the sensed pressure and the set torque limit (block 54). Pressure transducer 38 is very accurate and very responsive, thus allowing more accurate and timely control of limiting torque at the output shaft from IVT 14. When the sensed pressure reaches the calculated desired torque limit, then the fuel rate to IC engine 12 is reduced to in turn reduce the amount of input torque to IVT 14, thus limiting the output torque from IVT 14.

The method of operation of the present invention may also accommodate transient loads during operation (decision block 56). If a transient load such as an external hydraulic load is sensed, then a query is made as to whether the IC engine 12 is at a maximum torque output (decision block 58). If IC engine 12 is already operating at a maximum torque for a given engine speed, then it is not possible to further increase the torque output from IC engine 12, so instead the input/output (I/O) ratio from IVT 14 is increased (block 60). On the other hand, if IC engine 12 is not operating at a maximum torque for a given engine speed, then the torque output from IC engine 12 is increased to match the transient load (block 62).

In the event no transient load is detected, or the transient load passes (line 64), then the method continues until the IC engine 12 is turned OFF (decision block 66). While the IC engine 12 continues to run, control loops back to block 50, where a new or the old torque limit is set.

With the method of the present invention as described above, limiting the input torque from IC engine 12 based on readings from pressure transducer 38 is an extremely accurate way to control the maximum output torque from IVT 14, thus controlling tractive effort to meet the operator's demands under current conditions and maximize performance.

Having described the preferred embodiment, it will become apparent that various modifications can be made without departing from the scope of the invention as defined in the accompanying claims.

The invention claimed is:

1. A work machine, comprising:
   an internal combustion (IC) engine having an output;
   an infinitely variable transmission (IVT) coupled with said IC engine output, said IVT including a hydraulic module and a mechanical drivetrain module;
   a pressure transducer associated with and providing an output signal representing a hydraulic pressure within said hydraulic module; and
   at least one electrical processing circuit configured for controlling said IC engine output, dependent upon said output signal from said pressure transducer.

2. The work machine of claim 1, further including a torque control input device in communication with and providing an output signal to said at least one electrical processing circuit, said at least one electrical processing circuit configured for controlling said IC engine output, dependent upon each of said output signal from said pressure transducer and said output signal from said torque control input device.

3. The work machine of claim 2, wherein said torque control input device comprises an operator adjustable torque control dial.

4. The work machine of claim 3, wherein said torque control dial includes a minimum torque control setting and a maximum torque control setting.

5. The work machine of claim 1, wherein said at least one electrical processing circuit includes at least one of an engine control unit (ECU) associated with said IC engine, and a transmission control unit (TCU) associated with said hydrostatic transmission.

6. The work machine of claim 5, wherein said TCU receives said output signal from said pressure transducer, communicates with said ECU, and said ECU controls said IC engine output.

7. The work machine of claim 1, wherein said at least one electrical processing circuit controls said IC engine output by controlling a fuel rate to said IC engine.

8. The work machine of claim 7, wherein said IC engine output comprises a crankshaft, said hydraulic module being coupled with said crankshaft.

9. The work machine of claim 1, wherein said IVT comprises one of a hydromechanical transmission and a hydrostatic transmission.

10. The work machine of claim 1, wherein said maximum allowable load is associated with a maximum torque at a given operating speed for said IC engine.

11. The work machine of claim 1, wherein said work machine comprises one of a construction work machine, an agricultural work machine and a forestry work machine.

12. A method of operating a work machine including an internal combustion (IC) engine having an output, and an infinitely variable transmission (IVT) coupled with the IC engine output, the IVT including a hydraulic module and a mechanical drivetrain module, said method comprising the steps of:
setting a torque limit associated with the IVT;
sensing a hydraulic pressure within the hydraulic module; and
controlling an output of the IC engine, dependent upon said sensed hydraulic pressure and said torque limit.

13. The method of operating a work machine of claim 12, wherein said torque limit is set using an operator adjustable torque control dial.

14. The method of operating a work machine of claim 12, wherein said hydraulic pressure is sensed using a pressure transducer associated with and providing an output signal representing a hydraulic pressure within said hydraulic module.

15. The method of operating a work machine of claim 12, wherein said controlling step is carried out using at least one of an engine control unit (ECU) associated with said IC engine, and a transmission control unit (TCU) associated with said IVT.

* * * * *